(12) United States Patent
Morales

(10) Patent No.: US 8,462,221 B2
(45) Date of Patent: Jun. 11, 2013

(54) METHOD FOR PRODUCING HIGH DYNAMIC RANGE IMAGES

(75) Inventor: Efrain O. Morales, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 409 days.

(21) Appl. No.: 12/938,427

(22) Filed: Nov. 3, 2010

(65) Prior Publication Data
US 2012/0105681 A1    May 3, 2012

(51) Int. Cl.
H04N 5/235    (2006.01)

(52) U.S. Cl.
USPC ....................................... 348/221.1

(58) Field of Classification Search
USPC ....................... 348/222.1; 382/284
See application file for complete search history.

(56) References Cited

U.S. PATENT DOCUMENTS

| | | | |
|---|---|---|---|
| 3,971,065 A | 7/1976 | Bayer | |
| 5,012,333 A | 4/1991 | Lee et al. | |
| 5,506,619 A | 4/1996 | Adams, Jr. et al. | |
| 5,629,734 A | 5/1997 | Hamilton, Jr. et al. | |
| 5,652,621 A | 7/1997 | Adams, Jr. et al. | |
| 5,828,793 A | 10/1998 | Mann | |
| 6,040,858 A | 3/2000 | Ikeda | |
| 6,813,046 B1* | 11/2004 | Gindele et al. | 358/505 |
| 6,909,461 B1 | 6/2005 | Gallagher et al. | |
| 7,130,485 B2 | 10/2006 | Gindele et al. | |
| 7,616,256 B2 | 11/2009 | Ward et al. | |
| 2010/0026825 A1 | 2/2010 | Doida | |
| 2011/0149111 A1* | 6/2011 | Prentice et al. | 348/229.1 |
| 2011/0182528 A1 | 7/2011 | Scherteler et al. | |
| 2012/0105673 A1* | 5/2012 | Morales | 348/229.1 |

FOREIGN PATENT DOCUMENTS

| | | |
|---|---|---|
| DE | 10 2008 034979 | 1/2010 |
| EP | 1 868 373 | 12/2007 |
| WO | 2007/082562 | 7/2007 |

OTHER PUBLICATIONS

U.S. Appl. No. 12/644,039, filed Dec. 22, 2009, Prentice et al.
Devebec et al., "Recovering high dynamic range radiance maps from photographs," SIGGRAPH'97 Conference Proceedings, pp. 369-378 (1997).

\* cited by examiner

*Primary Examiner* — Roberto Velez
*Assistant Examiner* — Gary C Vieaux
(74) *Attorney, Agent, or Firm* — Kevin E. Spaulding

(57) ABSTRACT

A method for producing a high-dynamic-range image, comprising: receiving a low-resolution image of a scene having a first resolution and captured at a first exposure level; receiving a first high-resolution image of the scene having a second resolution and captured at a second exposure level different from the first exposure level, the second resolution being greater than the first resolution; forming a residual image corresponding to high spatial frequency content in the first high-resolution image; forming a second high-resolution image having the second resolution and the first exposure level by combining the low-resolution image and the residual image; producing the high-dynamic-range image by combining the first high-resolution image and the second high-resolution image; and storing the high-dynamic-range image in a processor accessible memory.

21 Claims, 10 Drawing Sheets

|   |   |   |   |
|---|---|---|---|
| R | G | R | G |
| G | B | G | B |
| R | G | R | G |
| G | B | G | B |

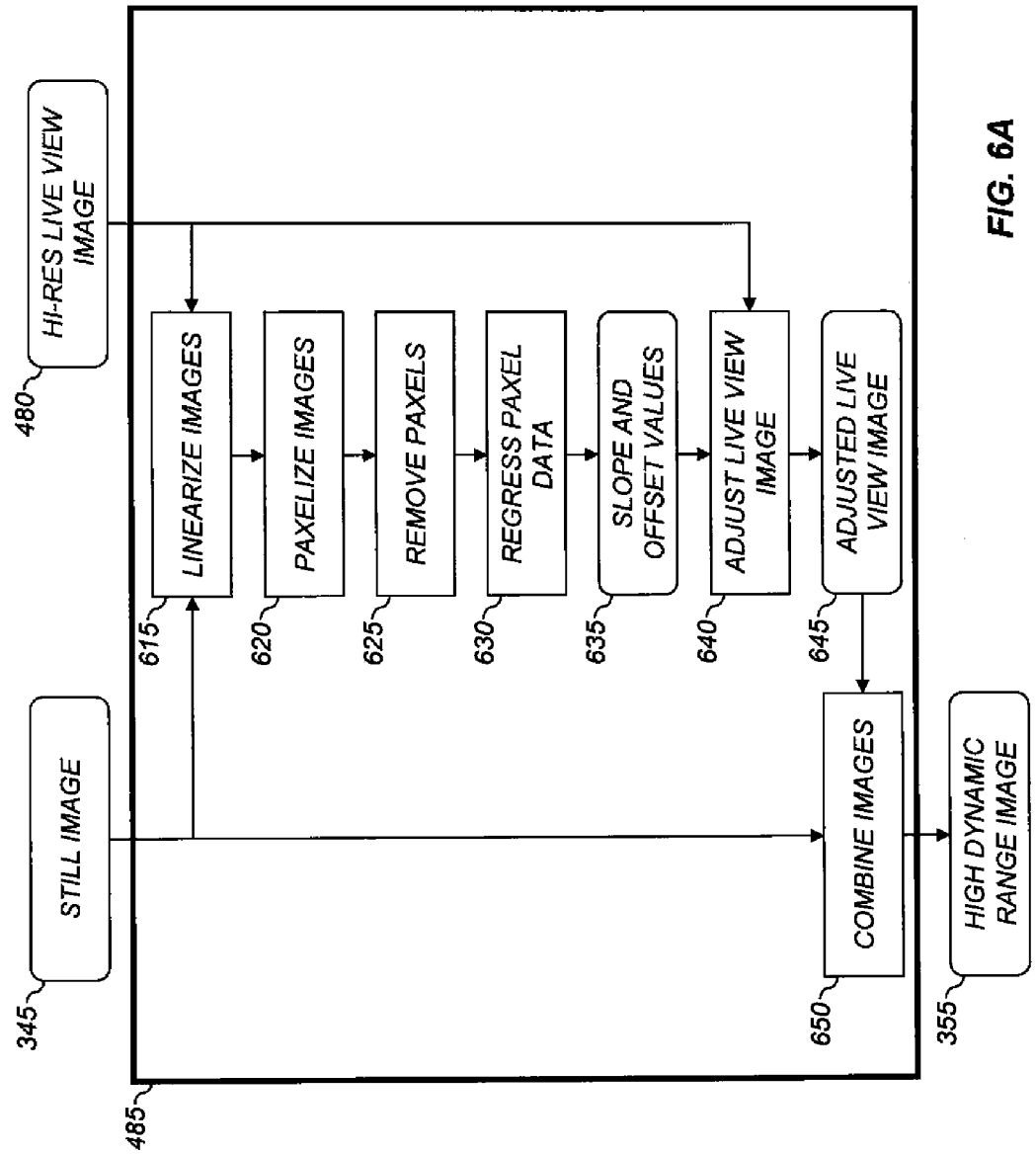

METHOD FOR PRODUCING HIGH DYNAMIC RANGE IMAGES

CROSS REFERENCE RELATED APPLICATION

Reference is made to commonly assigned, U.S. patent application Ser. No. 12/644,039, filed Dec. 22, 2009, by Wayne E. Prentice, et al., entitled "Creating an Image Using Still and Preview", and to commonly assigned, U.S. patent application Ser. No. 12/938,437, filed Nov. 3, 2010, by Efrain Morales., entitled "Digital camera providing high dynamic range images," both of which are incorporated herein by reference.

FIELD OF THE INVENTION

The invention pertains to generating an improved image by combining multiple images, and more specifically to a method for producing a high resolution image having increased dynamic range.

BACKGROUND OF THE INVENTION

Image sensing devices, such as charge-coupled devices (CCDs), are commonly found in such products as digital cameras, scanners, and video cameras. These image sensing devices have a very limited dynamic range when compared to traditional negative film products. A typical image sensing device has a dynamic range of about 5 stops. As a consequence, the exposure level for a typical scene must be determined with a fair amount of accuracy in order to avoid clipping the signal. As defined herein, exposure level is the total amount of light allowed to fall on an image sensing device during the process of sensing a scene to produce an image. When sensing a scene under fixed illumination with an imaging system with an optical path that has a fixed aperture, the exposure level is controlled by setting the imaging system's exposure time (shutter speed). When sensing a scene with fixed illumination with an imaging system with an optical path that has a variable aperture, the exposure level is controlled by setting the imaging system's exposure time and aperture.

Often times the scene has a very wide dynamic range as a result of multiple illuminants (e.g., front-lit and back-lit portions of a scene). In the case of a wide dynamic range scene, choosing an appropriate exposure for the subject often necessitates clipping data in another part of the image. The narrower dynamic range of an image sensing device relative to a scene therefore results in lesser image quality for images obtained by an image sensing device.

Methods to increase the dynamic range of images acquired by an image sensing device would allow such images to be rebalanced to achieve a more pleasing rendition of the image. Also, images with high dynamic range would allow for more pleasing contrast improvements, such as described by Lee et al. in commonly assigned U.S. Pat. No. 5,012,333, entitled "Interactive dynamic range adjustment system for printing digital images."

One method used for obtaining improved images with an image sensing device is exposure bracketing, whereby multiple still images of the same resolution are captured at a range of different exposure levels, and one of the images is selected as having a best overall exposure level. This technique, however, does not increase the dynamic range of any individual image captured by the image sensing device. As defined herein, the term resolution is used to refer to the number of pixels in an image.

One method for obtaining an image with a high dynamic range is by capturing multiple still images of the same resolution having different exposure levels, and then combining the images into a single output image having increased dynamic range. This approach is described commonly assigned U.S. Pat. No. 5,828,793 to Mann, entitled "Method and apparatus for producing digital images having extended dynamic ranges," and by commonly assigned U.S. Pat. No. 6,040,858 to Ikeda, "Method and apparatus for expanding the dynamic range of sensed color images." This approach often requires a separate capture mode and processing path in a digital camera. Additionally, the temporal proximity of the multiple captures is limited by the rate at which the images can be read out from the image sensor. Greater temporal disparity among captures increases the likelihood of motion existing among the captures, whether camera motion related to hand jitter, or scene motion resulting from objects moving within the scene. Motion increases the difficulty in merging multiple images into a single output image.

Another method for obtaining an image with high dynamic range which addresses the issue of motion existing among multiple images is the simultaneous capture of multiple images having different exposure levels. The images are subsequently combined into a single output image having increased dynamic range. This capture process can be achieved through the use of multiple imaging paths and sensors. However, this solution incurs extra cost due to the multiple imaging paths and sensors. It also introduces a correspondence problem among the multiple images, as the sensors are not co-located and thus generate images having different perspectives. Alternatively, a beam-splitter can be used to project incident light onto multiple sensors within a single image capture device. This solution incurs extra cost for the beam-splitter and multiple sensors, and also reduces the amount of light available to any individual image sensor thereby lessening the image quality because of a decrease in signal-to-noise performance.

Another method for obtaining an image with high dynamic range is through the use of an image sensor having some pixels with a standard response to light exposure and other pixels having a non-standard response to light exposure. Such a solution is described in commonly assigned U.S. Pat. No. 6,909,461 to Gallagher et al., entitled "Method and apparatus to extend the effective dynamic range of an image sensing device." Such a sensor has inferior performance, however, for scenes having a narrow dynamic range, as the pixels with a photographically slower, non-standard response have poorer signal-to-noise performance than pixels with a standard response.

Another method for obtaining an image with high dynamic range is through the use of an image sensor programmed to read out and store pixels within the image sensor at a first exposure level while continuing to expose the image sensor to light. Such a solution is described in commonly assigned U.S. Pat. No. 7,616,256 to Ward et al., entitled "Multiple exposure methods and apparatus for electronic cameras." In one example, pixels from a CCD are read into light-shielded vertical registers after a first exposure level is achieved, and exposure of the image sensor continues until a second exposure level is achieved. While this solution allows multiple readouts of individual pixels from the image sensor with minimal time between the exposures, it has the drawback of requiring specialized hardware to read the data out from the sensor.

Therefore, a need in the art exists for an improved solution to combining multiple images to form an image having high dynamic range, without requiring special hardware or additional image sensors, without sacrificing performance for scenes not requiring high dynamic range, without requiring a separate capture mode, and with minimal time between the multiple exposures.

SUMMARY OF THE INVENTION

The present invention represents a method for producing a high-dynamic-range image, comprising:

a) receiving a low-resolution image of a scene having a first resolution and captured at a first exposure level;

b) receiving a first high-resolution image of the scene having a second resolution and captured at a second exposure level different from the first exposure level, the second resolution being greater than the first resolution;

c) using a data processor to form a residual image corresponding to high spatial frequency content in the first high-resolution image;

d) using a data processor to form a second high-resolution image having the second resolution and the first exposure level by combining the low-resolution image and the residual image;

e) using a data processor to produce the high-dynamic-range image by combining the first high-resolution image and the second high-resolution image; and f) storing the high-dynamic-range image in a processor accessible memory.

An advantage of the present invention is that an image having high dynamic range can be produced without special hardware or additional image sensors.

A further advantage of the present invention is that an image having high dynamic range can be produced without sacrificing performance for scenes not requiring high dynamic range.

A further advantage of the present invention is that an image having high dynamic range can be produced without requiring a separate capture mode.

A still further advantage of the present invention is that an image having high dynamic range can be produced with minimal time between the multiple exposures.

This and other aspects, objects, features, and advantages of the present invention will be more clearly understood and appreciated from a review of the following detailed description of the preferred embodiments and appended claims, and by reference to the accompanying drawings.

An advantage of the present invention is that an image having high dynamic range can be produced without special hardware or additional image sensors.

A further advantage of the present invention is that an image having high dynamic range can be produced without sacrificing performance for scenes not requiring high dynamic range.

A further advantage of the present invention is that an image having high dynamic range can be produced without requiring a separate capture mode.

A still further advantage of the present invention is that an image having high dynamic range can be produced with minimal time between the multiple exposures.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 is an illustration of a prior art Bayer color filter array pattern on an image sensor;

FIG. 6A is a flowchart of a method for combining a still image and a high-resolution live view image according to an embodiment of the present invention;

DETAILED DESCRIPTION OF THE INVENTION

Because digital cameras employing imaging devices and related circuitry for signal capture and correction and for exposure control are well known, the present description will be directed in particular to elements forming part of or cooperating more directly with, a method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
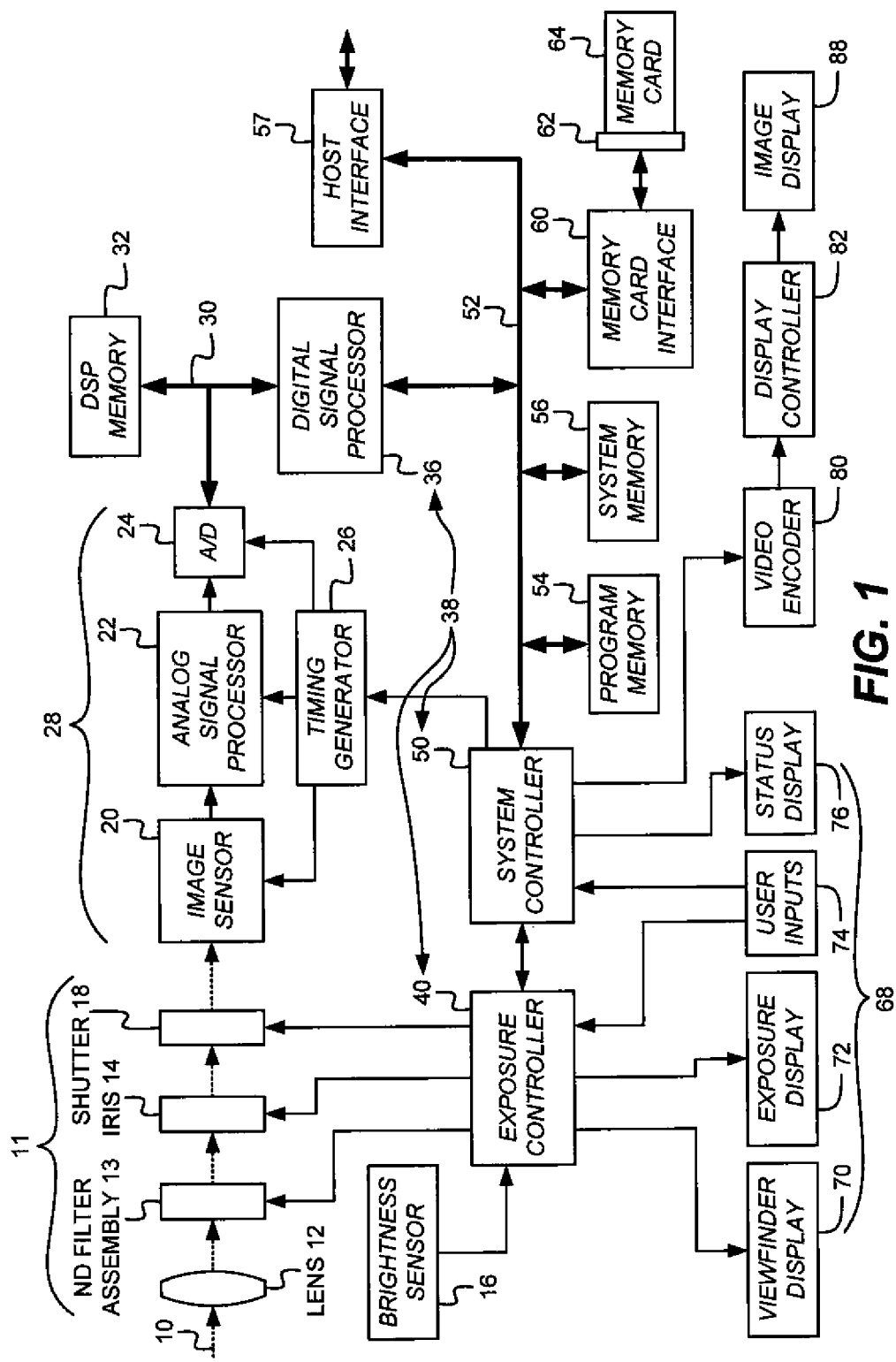
FIG. 1 is a block diagram of a digital still camera system for use with the processing methods of the current invention.

Turning now to FIG. 1, a block diagram of an image capture device shown as a digital camera embodying the present invention is shown. Although a digital camera will now be explained, the present invention is clearly applicable to other types of image capture devices, such as imaging sub-systems included in non-camera devices such as mobile phones and automotive vehicles, for example. Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor includes an arrangement of color filters, as described in more detail subsequently. The amount of light reaching the image sensor 20 is regulated by an iris 14 that varies an aperture and a filter block 13 that can include one or more ND filters interposed in the optical path. Also regulating the overall light level is the time that a shutter 18 is open. An exposure controller 40 responds to the amount of light available in the scene as metered by a brightness sensor 16 and controls all three of these regulating functions.

An analog signal from the image sensor 20 is processed by analog signal processor 22 and applied to analog-to-digital (A/D) converter 24 for digitizing the analog sensor signals. Timing generator 26 produces various clocking signals to select rows and pixels and synchronizes the operation of analog signal processor 22 and A/D converter 24. Image sensor stage 28 includes the image sensor 20, the analog signal processor 22, the A/D converter 24, and the timing generator 26. The functional elements of the image sensor stage 28 can be separately fabricated integrated circuits, or they can be fabricated as a single integrated circuit as is commonly done with CMOS image sensors. The resulting stream of digital pixel values from A/D converter 24 is stored in DSP memory 32 associated with a digital signal processor (DSP) 36.

DSP 36 is one of three processors or controllers in this embodiment, in addition to a system controller 50 and the exposure controller 40. Although this distribution of camera functional control among multiple controllers and processors is typical, these controllers or processors can be combinable in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor is preferably designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its DSP memory 32 according to a software program permanently stored in program memory 54 and copied to DSP memory 32 for execution during image capture. DSP 36 executes the software needed for practicing image processing shown in FIGS. 3A and 3B. DSP memory 32 includes any type of random access memory, such as SDRAM. A bus 30 comprising a pathway for address and data signals connects DSP 36 to its related DSP memory 32, A/D converter 24 and other related devices.

The system controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, the filter block 13, iris 14, and shutter 18 as previously described, directing the timing generator 26 to operate the image sensor 20 and associated elements, and directing DSP 36 to process the captured image data. After an image is captured and processed, the final image file stored in DSP memory 32 is transferred to a host computer via host interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Secure Digital (SD) card inserted into socket 62 and connected to the system controller 50 via memory card interface 60. Other types of storage that are used include without limitation PC-Cards, MultiMedia Cards (MMC), or Compact Flash (CF) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touch screens. Exposure controller 40 operates light metering, exposure mode, autofocus and other exposure functions. The system controller 50 manages the graphical user interface (GUI) presented on one or more of the displays (e.g., on image display 88). The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating (exposure index), aperture and shutter speed. In this case, as the user changes one or more settings, the light meter indicator presented on viewfinder display 70 can be configured to indicate to the user to what degree the image will be overexposed or underexposed. In an automatic exposure mode, the user changes one setting and the exposure controller 40 automatically alters another setting to maintain correct exposure level. For example, for a given ISO speed rating when the user reduces the lens aperture, the exposure controller 40 will automatically increase the exposure time to maintain the same overall exposure level.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure level, proper tone reproduction can generally be maintained by increasing the electronic or digital gain, but the image will contain an unacceptable amount of noise. As the exposure level is increased, the gain is decreased, and therefore the image noise can normally be reduced to an acceptable level. If the exposure level is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposure levels. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposure levels. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure level provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure level provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system could be added, or the lens is detachable and interchangeable. It will be understood that the present invention is applied to any type of digital camera or, more generally, digital image capture apparatus, where alternative modules provide similar functionality.

Given the illustrative example of FIG. 1, the following description will then describe in detail the operation of this camera for capturing images according to the present invention. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band. The terms exposure duration and exposure time are used interchangeably.

As image sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

Figure 2:
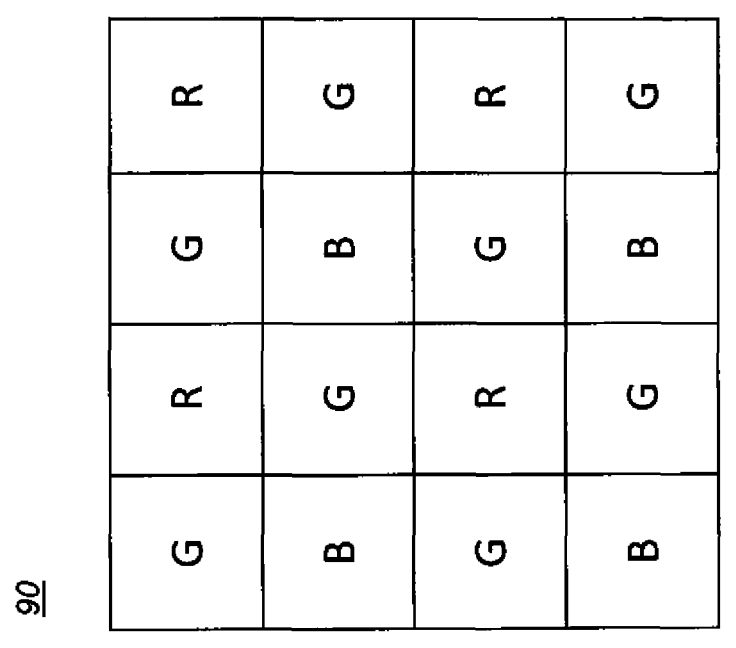

In order to produce a color image, the array of pixels in an image sensor typically has a pattern of color filters placed over them. FIG. 2 shows a color filter array (CFA) pattern 90 of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

An image captured using an image sensor 20 having a two-dimensional array with the CFA pattern 90 of FIG. 2 has only one color value at each pixel.

In order to produce a full color image, there are a number of techniques for inferring or interpolating the missing colors at each pixel. These CFA interpolation techniques are well known in the art and reference is made to the following patents: U.S. Pat. No. 5,506,619, U.S. Pat. No. 5,629,734, and U.S. Pat. No. 5,652,621 for representative examples.

Figure 3A:
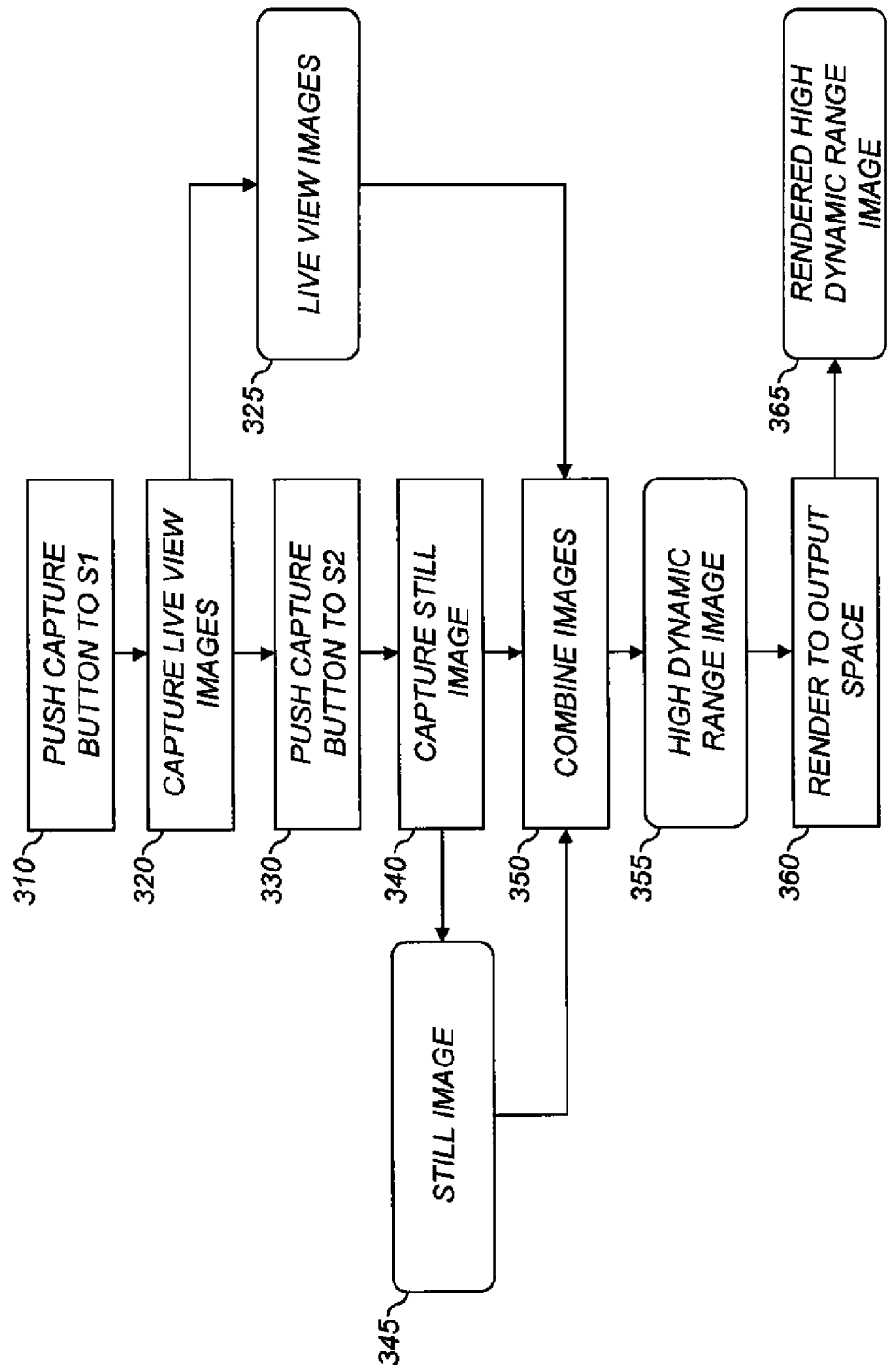
FIG. 3A is a flow chart for an embodiment of the present invention.

FIG. 3A illustrates a flow diagram according to an embodiment of the present invention. In push camera button to S1 step 310, the operator begins the image acquisition process by pushing a capture button on the digital camera from the S0 position (undepressed position) to the S1 position (partially depressed position) thereby sending a partially-depressed-capture-button signal to the system controller 50 in the digital camera, as the operator composes the image. The system controller 50 then instructs the camera to begin acquiring live view images 325 using a capture live view images step 320. The captured live view images 325 are displayed to the operator on image display 88 to aid in the composition of the image. One or more of the captured live view images 325 are also stored into DSP memory 32 for later use. Generally, the captured live view images 325 have a reduced spatial resolution relative to the full sensor resolution. The reduced spatial resolution is obtained by using only a portion of the pixels in the image sensor 20, or by combining the signals from multiple pixels. It should be noted that at the same time, the system controller 50 in the camera would also typically complete autofocus and autoexposure operations.

When the moment of acquisition is identified by the operator, the operator pushes the capture button from the S1 position to an S2 position (fully depressed position) thereby sending a fully-depressed-capture-button signal to the system controller 50 in the camera, as shown in push capture button to S2 step 330. At this point, in capture still image step 340, the system controller 50 instructs the digital camera to stop continuous acquisition or capture of the live view images 325 and to initiate the capture of a still image 345 having a spatial resolution greater than the spatial resolution of the captured live view images 325. The exposure level used to capture the still image 345 is set to a different level than the exposure level used to capture the live view images 325 in order to provide information that can be used to extend the dynamic range. The different exposure level can either be greater than or less than the exposure level of the captured live view images 325.

In combine images step 350 one or more of the captured live view images 325 and the captured still image 345 are combined to form a high dynamic range image 355 having greater dynamic range than the original captured still image. Finally, in render to output space step 360, the improved still image is rendered to an output color space producing rendered high dynamic range image 365 and is stored in a digital image file in a processor-accessible memory, for example on memory card 64.

The live view images 325 acquired in capture live view images step 320 are from a live view image stream, such as is typically displayed on the image display 88. The live view images 325 of such a live view image stream are typically captured and displayed at 30 frames per second at a spatial resolution of 320 columns by 240 rows (QVGA resolution), or at 640 columns by 480 rows (VGA resolution). This spatial resolution is not limiting, however, and the live view images 325 can be captured at a greater spatial resolution. The live view images 325 can also be displayed at a greater spatial resolution. The maximum frequency at which the live view images 325 can be captured and read out from the sensor is inversely proportional to the spatial resolution of the live view images 325.

Each live view image 325 acquired in capture live view images step 320 is initially captured with a certain effective exposure level. As used herein, effective exposure level is defined as the scaled exposure level for a given image, wherein the scaling is done by multiplying the exposure level by any binning factor used when reading out the image data from the sensor. For example, an image sensor using an exposure level E for a live view image 325, along with a binning factor of 9, generates an effective exposure level of 9E for the live view image 325. In this context, binning refers to the accumulation of charge from neighboring pixels prior to read-out, and the binning factor refers to how many pixels have their charge accumulated into a single value which is read out. Binning typically occurs by accumulating charge from like pixels within the CFA pattern on the image sensor. For example, in FIG. 2, a binning factor of 4 could be achieved by accumulating the charge from all 4 red pixels shown in the illustration to form a single red pixel, and by similarly accumulating charge for blue pixels and for green pixels. Note that there are twice as many green pixels as blue or red in a Bayer pattern, and they would be accumulated in two independent groups to form two separate binned pixels.

The still image 345 captured in capture still image step 340 is of greater spatial resolution than the live view images 325 acquired during capture live view images step 320. Often, the still image 345 has the full spatial resolution of the image sensor 20. The still image 345 is captured at an effective exposure level that is different than the effective exposure level corresponding to the live view image 325. The difference in effective exposure level allows the subsequent generation of the high dynamic range image 355.

The acquisition of live view images 325 can also occur when the capture button is not in the S1 position. For example, live view images 325 can be captured when the shutter button is in the S0 position. The acquisition of live view images 325 can also continue through a transition from the S0 to S1 shutter button positions, or through a transition from S1 to S2 shutter button positions.

Each acquired live view image 325 has an effective exposure level that is different from the effective exposure level of the still image 345. In one embodiment of the present invention, the acquired live view images 325 have effective exposure levels that are less than the effective exposure level of the still image 345. In this scenario, the still image 345 can contain pixels that are clipped from over-exposure to light, while the corresponding pixels in the live view images 325 are not clipped. The live view images 325 with lesser effective exposure levels can therefore provide additional information to extend the dynamic range of the still image 345. It is noted that a pixel value increases with increasing scene luminance to a point at which the pixel value no longer increases, but stays the same. This point is referred to as the clipped value. When a pixel is at the clipped value, it is said to be clipped.

In another embodiment of the present invention, the acquired live view images 325 have effective exposure levels that are greater than the effective exposure level of the still image 345. In this scenario, the still image 345 can contain regions that are dark and have a low signal-to-noise ratio. These dark regions can be brightened by applying a digital gain factor to those pixel values, or by applying a tone scaling operation that brings out details in the shadows, but this increases the noise along with the signal. The live view images 325 with greater effective exposure levels can be used to provide additional information with reduced noise in these dark image regions, thereby extending the dynamic range of the image. The improved signal-to-noise performance in the dark regions allows these regions to be lightened with less risk of objectionable noise.

There is no constraint that all of the live view images 325 need to be captured using the same effective exposure level. In another embodiment of the present invention, at least one acquired live view image has an effective exposure level that is lesser than the effective exposure level of the still image 345, and at least one acquired live view image 325 has an effective exposure level that is greater than the effective exposure of the still image 345. In this scenario, it is possible to improve the quality of the still image 345 in both dark image regions and clipped image regions using the additional information provided in the live view images 325.

When using multiple images to generate an image with high dynamic range, it is preferable that the multiple images capture the same scene. To achieve this, the multiple images can be acquired with as little temporal disparity among the images as possible. This minimizes the potential for any changes in the scene that result from events such as camera motion, object motion, or lighting changes. In general, the live view image stream produces a continuous stream of live view images 325, followed by the capture of a still image 345. In order to minimize the temporal disparity between the acquired live view images 325 and the still image 345, the most recently captured live view images 325 from the live view image stream can be acquired and stored, continuously replacing older live view images 325.

In the case that live view images 325 with multiple different effective exposure levels are acquired and stored, it is necessary to vary the effective exposure levels of the images in the live view image stream. One method for acquiring live view images 325 having two effective exposure levels is to capture live view images having alternating effective exposure levels. Such a strategy always guarantees that when the still image 345 is captured, the two most recently captured live view images 325 include one having the first effective exposure level, and the other having the second effective exposure level. The drawback of such a strategy is that it can be difficult to display live view images 325 having alternating effective exposure levels on the back of the camera without visual artifacts. In some cases, however, the live view images 325 can be captured at a rate exceeding the rate at which live view images 325 are displayed on the back of the camera. For example, if live view images 325 are captured at 60 frames per second, and displayed on the back of the camera at 30 frames per second, it is only necessary to have live view images 325 corresponding to a single effective exposure level used for display on the back of the camera, eliminating the concern of visual artifacts.

Figure 3B:
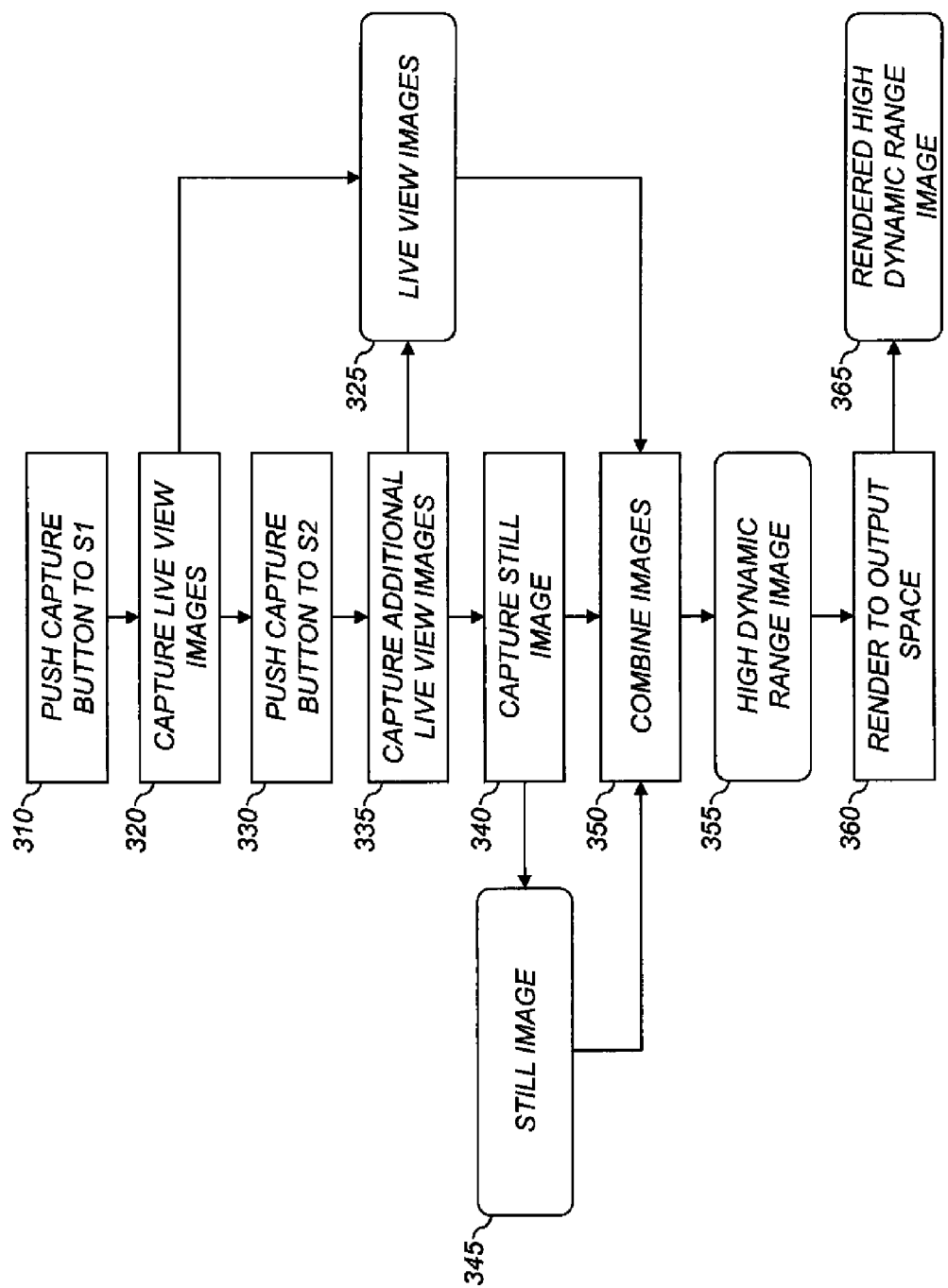
FIG. 3B is a flow chart for an alternate embodiment of the present invention.

FIG. 3B illustrates an alternate method for acquiring live view images 325 having different effective exposure levels. In capture button to S1 step 310, the operator begins the image acquisition process by pushing the capture button on the camera from the S0 position (undepressed position) to the S1 position (partially depressed position) thereby sending a partially-depressed-capture-button signal to the system controller 50 in the camera, as the operator composes the image. The system controller 50 then instructs the camera to begin acquiring and storing live view images 325 using capture live view images step 320, using available DSP memory 32. The acquired live view images 325 can correspond to a single effective exposure level. When the moment of acquisition is identified by the operator, the operator pushes the capture button from the S1 position to the S2 position (fully depressed position) thereby sending a fully-depressed-capture-button signal to the system controller 50 in the camera, as shown in push capture button to S2 step 330. At this point, in capture additional live view images step 335, the system controller 50 instructs the camera to capture at least one additional live view image 325 at a different effective exposure level than previously acquired. After the one or more additional live view images 325 are captured, the system controller 50 instructs the camera in capture still image step 340 to stop continuous acquisition of the live view images and to initiate the capture of a still image 345 having a spatial resolution greater than the live view images 325. In combine images step 350 the captured live view images 325 having the different effective exposure levels and the captured still image 345 are combined to form an improved still image having greater dynamic range than the original captured still image 345. Finally, in render to output space step 360, the improved still image is rendered to an output space and the resulting high dynamic range image 355 is stored in a digital image file in a processor-accessible memory, for example on memory card 64.

By delaying the capture of a live view image 325 having the second effective exposure level until after the user has pushed the capture button from the S1 position to the S2 position, the live view images 325 captured prior to the push capture button to S2 step 330 can be displayed on the back of the camera without concern for visual artifacts resulting from varying the effective exposure level of the live view images 325.

In all cases, the live view images 325 can be captured automatically, without the user required to switch camera modes, or manually set the exposure level for the live view images 325.

Figure 4A:
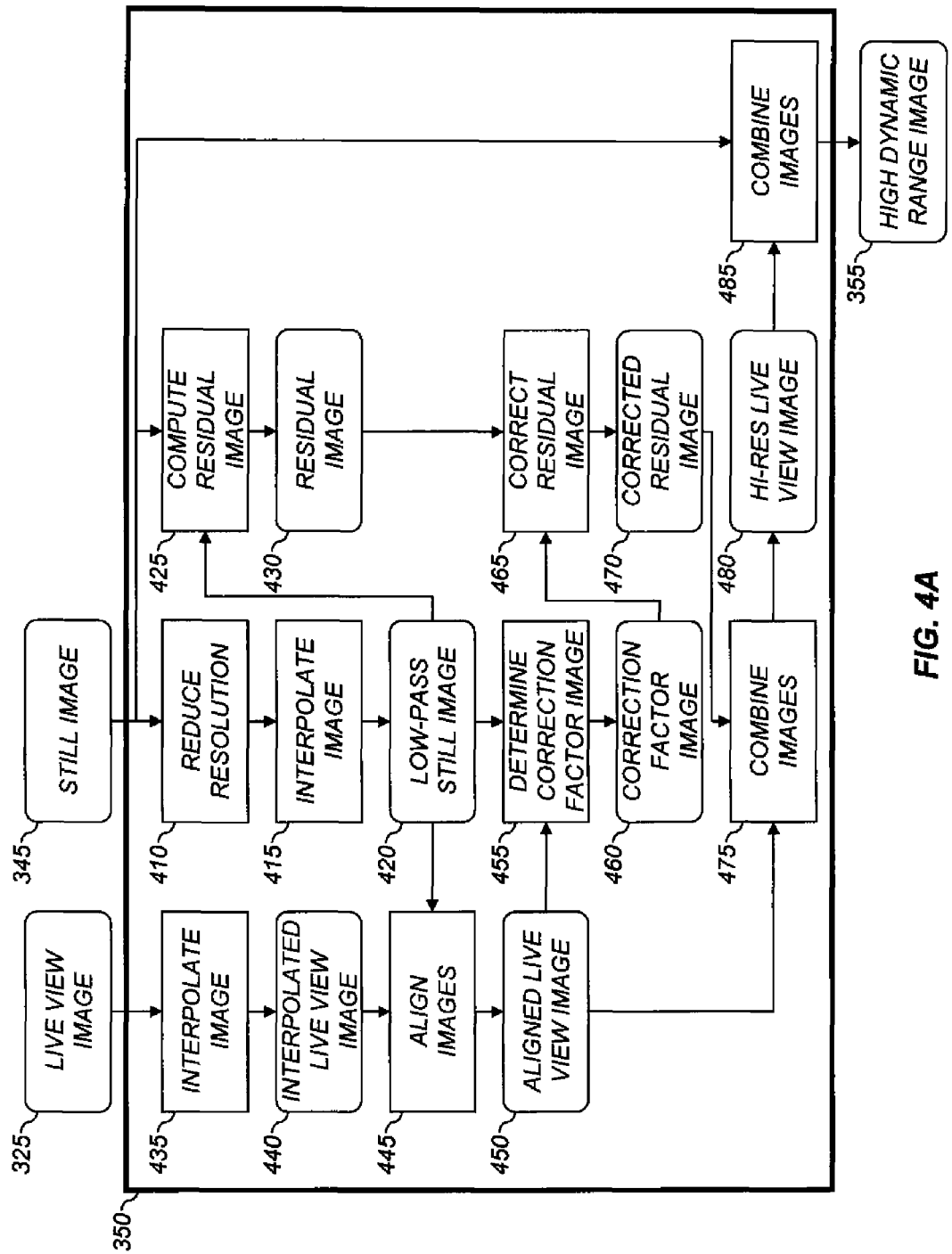
FIG. 4A is a flowchart of a method for combining live view and still images according to an embodiment the present invention.

FIG. 4A describes in more detail the combine images step 350 from FIG. 3A and FIG. 3B. according to one embodiment of the present invention. The inputs to the combine images step 350 are one of the one or more live view images 325 and the still image 345. Initially, the still image 345 is reduced in resolution using reduce resolution step 410, producing a representative low-resolution image. In a preferred embodiment, the representative low-resolution image has the same resolution as the live view image 325, and is therefore representative of an image that would have been captured using the live view image stream. The reduce resolution step 410 can comprise pixel combining, decimation and cropping. In a preferred embodiment, the reduce resolution step 410 is designed to mimic the steps used by the camera to generate the live view image 325.

An example of a reduction of resolution is as follows for a 12 megapixel Bayer pattern image sensor having 4032 columns×3034 rows. The still image 345 is reduced to generate a 1312×506 representative low-resolution image having the same resolution as the live view image 325 generated while the camera button is pressed to the S1 position. The 4032 columns×3034 rows are digitally combined by a factor of 3× in each dimension to produce the representative low-resolution image. This can be achieved by combining the pixel values of corresponding Bayer pattern pixel locations. Nine blue pixel values are combined to generate one combined blue pixel value. Similarly nine red pixel values are combined to generate one combined red pixel value. Nine green pixels values on the same rows as red pixels are combined to form a combined green pixel value. And nine green pixels on the same rows as blue pixels are combined to form another combined green pixel value. The combined pixel values can be normalized by dividing the combined pixel value by the number of pixels contributing to the value. The combination step can also discard some of the pixel values. For instance, only six of the nine pixel values can be used when forming the combined pixel value. The resulting image has resolution 1342×1010 and retains a Bayer pattern. To reduce the vertical resolution further by a factor of 2× while maintaining an image with Bayer pattern structure, every other pair of rows is discarded. This results in a Bayer pattern image having resolution 1342×506. Finally, 16 columns are cropped from the left of the image, and 14 columns are cropped from the right of the image to generate an image with resolution 1312×506 corresponding to the resolution of a live view image 325.

The representative low-resolution image is subsequently spatially interpolated back to the resolution of the original still image 345 using an interpolate image step 415. The interpolate image step 415 process generates a low-pass still image 420 having reduced high-frequency image content relative to the original still image 345. (In the case that some rows or columns of the original still image are cropped during the formation of the representative low-resolution image, the interpolation step only generates an interpolated image with the same resolution as the cropped still image.) In a preferred embodiment, bicubic interpolation is used to generate the low-pass still image 420. Those skilled in the art will recognize, however, that there exist many suitable interpolation techniques that can be used to generate the low-pass still image 420.

In alternate embodiments, the low-pass still image 420 can be computed in a variety of different ways. For example, in some embodiments the low-pass still image 420 can be formed by applying a low-pass convolution filter directly to the still image 345. Preferably, the low-pass convolution filter should be designed such that the frequency content of the low-pass still image 420 is a simulation of the frequency content in the live view image 325.

A compute residual image step 425 is used to calculate a residual image 430 representing a difference between the still image 345 and the low-pass still image 420. In a preferred embodiment, the low-pass still image 420 is subtracted from the original still image 345 to generate the residual image 430. If the original still image 345 and the low-pass still image 420 are of different sizes, the residual image 430 can be the same size as the low-pass still image 420, and additional rows and columns from the original still image 345 can be ignored. Alternatively, the residual image 430 can be the same size as the original still image 345, and the residual image 430 can have values equal to the original still image 345 at any locations outside the boundaries of the low-pass still image 420.

Those skilled in the art will recognize that there are other methods of producing a residual image appropriate for use according to the method of the present invention. For example, the residual image 430 can be computed directly from the still image 345 by applying an appropriately designed high-pass convolution filter. Preferably, the high-pass convolution filter should be designed such that the frequency content of the residual image 430 is an estimate of the frequency content from the still image 345 that is not included in the live view image 325 (and the low-pass still image 420), and would be similar to the residual image 430 that would be generated using the steps described above. In other embodiments, wavelet transformation methods can be applied to produce the residual image 430.

An interpolate image step 435 is used to interpolate the live view image 325 back to the resolution of the (possibly cropped) still image 345, producing one or more interpolated live view image 440. In a preferred embodiment, the interpolate image step 435 is identical to the interpolate image step 415 described earlier.

In align images step 445, the interpolated live view image 440 is aligned with the low-pass still image 420 to account for motion that may have occurred between the two exposures, producing aligned live view image 450. In one method of motion image alignment, a global motion compensation step is applied to align the two images. The global motion compensation can include translation, rotation and scaling operations, or a combination thereof. Methods of global motion estimation and compensation are well-known to those of skill in the art, and any suitable method can be applied to align the interpolated live view image 440 and the low-pass still image 420. In a preferred embodiment, in the case that the images being aligned are CFA images, the motion estimation step is restricted to translational motion of an integer multiple of the CFA pattern size, such as 2×2 in the case of a Bayer pattern, to ensure that the motion-compensated images retain a Bayer pattern.

Local motion estimation and compensation can be used to replace or refine the global motion estimate. Methods of local motion estimation and compensation are well-known to those of skill in the art, and any suitable method can be applied to locally align the interpolated live view and interpolated still images. In particular, block-based motion estimation algorithms can be used to determine motion estimates on local regions (blocks).

In determine correction factor image step 455, the image having a lesser exposure level (either aligned live view image 450 or low-pass still image 420) is used to determine the amounts of clipping present in the image having a greater exposure level to produce a final correction factor image 460.

Figure 5:
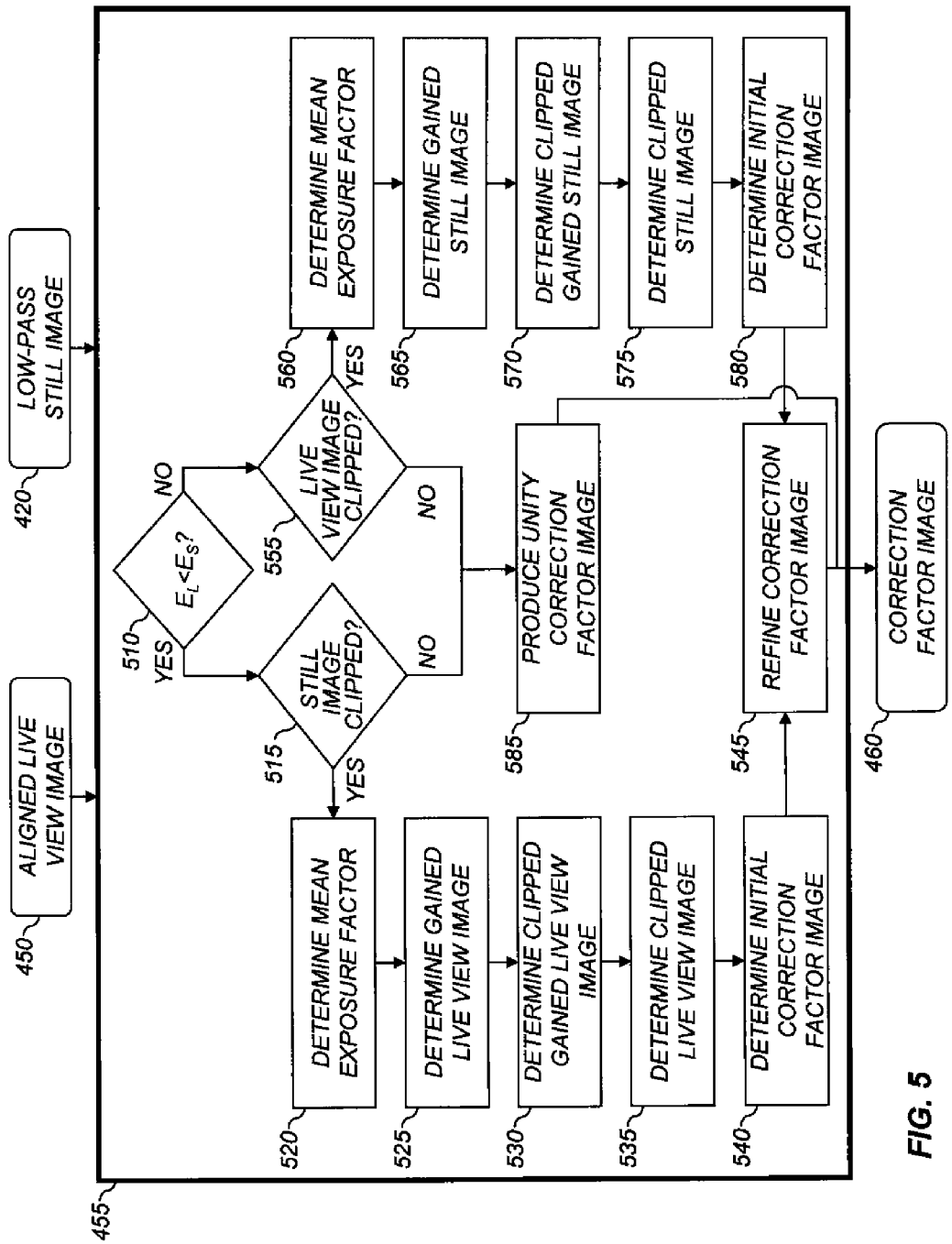
FIG. 5 is a flowchart of a method for determining a correction factor image according to an embodiment of the present invention.

FIG. 5 illustrates additional details for the determine correction factor image step 455 according to an embodiment of the present invention. There are two cases to consider. A first case where the live view image 325 was captured with an exposure level that is lower than the exposure level of the still image 345, and a second case where the live view image 325 was captured with an exposure level that is higher than the exposure level of the still image 345. A representation of the exposure level associated with each of the images can be determined by computing an average of the pixels values in the images. (For the steps described with respect to FIG. 5, it will be assumed that the code values are a linear exposure metric.) The mean pixel value for the low-pass still image 420 will be given by $E_S$, and the mean pixel value for the aligned live view image 450 will be given by $E_L$. Any pixels that are clipped in either image are excluded when calculating the means.

An exposure test 510 compares the mean pixel values to identify the image with the higher exposure. If $E_L < E_S$, then the live view image 325 was captured with a lower exposure level than the still image 345 and execution proceeds to a still image clipped test 515. The still image clipped test 515 checks the pixels of the low-pass still image 420 to see whether any of the pixels are clipped. If no clipped pixels are detected, then a produce unity correction factor image step 585 is used to produce a correction factor image 460 where all of the values are set to 1.0. If clipped pixels are detected, then a determine mean exposure factor step 520 is executed.

For image data in a linear exposure metric, the mean value of the image data in the low-pass still image 420 will be approximately related by a multiplicative term to the mean value of the image data in the aligned live view image 450 if flare is neglected. The multiplicative term, henceforth called MeanExposureFactor, may be obtained by dividing the mean value of the pixel values for the low-pass still image ($E_S$) by the mean value of the pixel values for the aligned live view image ($E_L$). The value of MeanExposureFactor will be greater than 1.0.

In determine gained live view image step 525, the aligned live view image 450 is multiplied by MeanExposureFactor, producing a gained live view image. In a determined clipped gained live view image step 530, all pixel values of the gained live view image that are above the clipped value of the low-pass still image 420 are set to the clipped value, producing a clipped gained live view image. In a determined clipped live view image step 535, the clipped gained live view image data is then divided by MeanExposureFactor to produce a clipped live view image.

In a determine initial correction factor image step 540, each pixel value of the aligned live view image 450 is divided by the corresponding pixel value of the clipped live view image to produce an initial correction factor image, wherein the pixel values of the initial correction factor image are necessarily equal to or greater than one. Moreover, a pixel value of the initial correction factor image is greater than one only on a spatial location where the clipped live view image has clipped pixels. The spatial locations where the clipped live view image has clipped pixels are assumed to be the spatial locations where the low-pass still image 420 has clipped pixels. Therefore, the initial correction factor image is an estimate of the image that is needed to multiply by the low-pass still image 420 to obtain a version of the low-pass still image without clipped pixels, and as such each pixel in the initial correction image has a value that corresponds to an estimate of the amount of clipping in the low-pass still image 420 at the corresponding spatial location.

However, it can be shown that the initial correction factor image pixel values are correct only on spatial locations that are away from the clipped pixels that represent object edges of a captured scene. The initial correction factor image pixels that represent clipped object edges of a captured scene, or that are near pixels that represent clipped object edges of a captured scene, will generally have underestimated pixel values. That is, the amount of clipping on or near clipped edges is generally underestimated. In one preferred embodiment of the current invention, it is assumed that any pixels that did not exist before the interpolate image step 415 or the interpolate image step 435 correspond to underestimated amounts of clipping in the initial scale factor image. Furthermore, in the same embodiment, it is assumed that all pixels that existed before the interpolate image step 415 or the interpolate image step 435 correspond to correct amounts of clipping in the initial scale factor image.

A refine correction factor image step 545 is used to properly estimate an underestimated pixel value of the initial correction factor image. First, the underestimated pixel value is replaced by the maximum correct amount of clipping value within a neighborhood that contains the underestimated pixel value. Once a pixel value of the initial correction factor image has been properly estimated, it is considered to correspond to a correct amount of clipping. All underestimated pixel values of the initial correction factor image are similarly properly estimated to produce an intermediate correction factor image. Next, the pixel values of the intermediate correction factor image that correspond to correct amounts of clipping in the initial scale factor image are modified to produce a final correction factor image. This operation is performed to prevent impulse artifacts. In one embodiment of the present invention, a pixel value of the intermediate correction factor image that corresponds to a correct amount of clipping in the initial scale factor image is replaced by the median pixel value in the 3×3 neighborhood surrounding the pixel. All pixel values of the intermediate correction factor image that correspond to a correct amount of clipping in the initial scale factor image are similarly replaced to produce the final correction factor image 460.

Those skilled in the art will recognize that other suitable techniques exist to produce a correction factor image 460. For example, an initial scale factor image may be produced at the resolution of the live view image 325 and the initial scale factor image may be up-sampled to the resolution of the still image 345 using successive nearest-neighbor interpolation where the maximum-valued neighbor may be used if there are at least two nearest neighbors to properly estimate the underestimated amounts of clipping in the initial correction factor image.

It is noted that if a pixel is clipped in both the aligned live view image 450 and the low-pass still image 420, the exact amount of clipping cannot be estimated properly and therefore only a partial amount of clipping correction is determined at that pixel location.

The above example for determining the amounts of clipping and thereby producing a final correction factor image 460 describes a case when the live view image 325 has an exposure level that is less than that of the still image 345, wherein the still image 345 has clipped pixels. A second example is described next for the case when the still image 345 has an exposure level that is less than that of the live view image 325, wherein the live view image 325 has clipped pixels. In this case, the exposure test 510 will determine that $E_L > E_S$, and execution proceeds to a live view image clipped test 555. The live view image clipped test 555 checks the pixels of the aligned live view image 450 to see whether any of the pixels are clipped. If no clipped pixels are detected, then the produce unity correction factor image step 585 is used to produce a correction factor image 460 where all of the values are set to 1.0. If clipped pixels are detected, then a determine mean exposure factor step 560 is executed.

In the determine mean exposure factor step 560, the value of MeanExposureFactor is obtained by dividing the mean value of the pixel values for aligned live view image ($E_L$) by the mean value of the low-pass still image data ($E_S$). The value of MeanExposureFactor will be greater than 1.0.

In determine gained still image step 565, the low-pass still image 420 is multiplied by MeanExposureFactor, producing a gained still image. In a determine clipped gained still image step 570, all pixel values of the gained still image that are above the clipped value of the aligned live view image 450 are set to the clipped value producing a clipped gained still image. In a determine clipped still image step 575, the clipped gained still image is then divided by MeanExposureFactor to produce a clipped still image.

In a determine initial correction factor image step 580, each pixel value of the clipped still image is divided by the corresponding pixel value of the low-pass still image 520 to produce an initial correction factor image, wherein the pixel values of the initial correction factor image are necessarily equal to or less than one. Moreover, a pixel value of the initial correction factor image is less than one only on a spatial location where the clipped still image has clipped pixels. The spatial locations where the clipped still image has clipped pixels are assumed to be the spatial locations where the aligned live view image 450 has clipped pixels. Therefore, the initial correction factor image is an estimate of the image that is needed to divide the aligned live view image 450 to obtain a version of the aligned live view image without clipped pixels, and as such each pixel in the initial correction image has a value that corresponds to an estimate of the inverse of the amount of clipping in the aligned live view image 450 at the corresponding spatial location.

However, it can be shown that the initial correction factor image pixel values are correct only on spatial locations that are away from the clipped pixels that represent object edges of a captured scene. The initial correction factor image pixels that represent clipped object edges of a captured scene, or that are near pixels that represent clipped object edges of a captured scene, will generally have overestimated pixel values. That is, the inverse amount of clipping on or near clipped edges is generally overestimated. In one preferred embodiment of the current invention, it is assumed that any pixels that did not exist before the interpolate image step 415 or the interpolate image step 435 correspond to overestimated inverse amounts of clipping in the initial scale factor image. Furthermore, in the same embodiment, it is assumed that all pixels that existed before the interpolate image step 415 or the interpolate image step 435 correspond to correct inverse amounts of clipping in the initial scale factor image.

The refine correction factor image step 545 is used to properly estimate an overestimated pixel value of the initial correction factor image. First, the overestimated pixel value is replaced by the minimum correct inverse amount of clipping value within a neighborhood that contains the overestimated pixel value. Once a pixel value of the initial correction factor image has been properly estimated, it is considered to correspond to a correct inverse amount of clipping. All overestimated pixel values of the initial correction factor image are similarly properly estimated to produce an intermediate correction factor image. Next, the pixel values of the intermediate correction factor image that correspond to correct amounts of clipping in the initial scale factor image are modified to produce a final correction factor image. This operation is performed to prevent impulse artifacts. In one embodiment of the present invention, a pixel value of the intermediate correction factor image that corresponds to a correct amount of clipping in the initial scale factor image is replaced by the median pixel value in the 3×3 neighborhood surrounding the pixel. All pixel values of the intermediate correction factor image that correspond to a correct amount of clipping in the initial scale factor image are similarly replaced to produce the final correction factor image 460.

Returning now to a discussion of FIG. 4A, the correction factor image 460 and the residual image 430 are combined using a correct residual image step 465 producing a corrected residual image 470. A method for combining the residual image 430 with the correction factor image 460 to produce the corrected residual image 470 is to multiply the residual image 430 by the correction factor image 460. Another method is to clip the correction factor image 460 to some clipped value, wherein the clipped value represents a maximum allowed correction factor, and then multiply the residual image 430 by the clipped correction factor image. Those skilled in the art will recognize that there are other methods of combining the residual image 430 with the correction factor image 460 to produce the corrected residual image 470, including, but not limited to, linearly or non-linearly transforming the correction factor image 460 before multiplying it by the residual image 430.

In combine images step 475, the interpolated live view image 440 is combined with the corrected residual image 470 to form a high-resolution live view image 480. One method of combining the interpolated live view image 440 with the corrected residual image 470 to produce the high-resolution live view image 480 is to add the corrected residual image 470 to the interpolated live view image 440. Another method includes noise-reducing and gaining the corrected residual image 470 producing a modified corrected residual image, then adding the modified corrected residual image to the interpolated live view image 440. Those skilled in the art will recognize that there are other methods of combining an interpolated live view image 440 with a corrected residual image 470 to produce a high-resolution live view image 480 including, but not limited to, linearly or non-linearly transforming the corrected residual image 470 before adding the interpolated live view image 440.

Finally, the high dynamic range image 355 is produced using combine images step 485 by forming a combination of the high-resolution live view image 480 and the still image 345. In some embodiments, rather than using the original still image 345, a reconstructed still image can be formed by combining the low-pass still image 420 and the corrected residual image 470. In this way, the still image 345 does not have be retained in memory after the corrected residual image 470 has been determined.

FIG. 6A describes the combine images step 485 in more detail according to a preferred embodiment of the present invention. Inputs to this step are the still image 345 and the high-resolution live view image 480. In some embodiments, a reconstructed still image can be used in place of the still image, where the reconstructed still image is formed by combining the low-pass still image 420 and the corrected residual image 470. Preferably, the reconstructed still image can be formed by performing the inverse operation to that of the compute residual image step 425 in FIGS. 4A and 4B. In a preferred embodiment wherein the low-pass still image 420 is subtracted from the still image 345 to generate the residual image 430 in step 425, the corrected residual image 470 is added to the low-pass still image 420 to produce the reconstructed still image.

First, a linearize images step 615 is applied to process the still image 345 and the high-resolution live view image 480 such that they are in a linear exposure metric. That is to say the processed pixel values are in a metric that is proportional to exposure.

To combine the still image 345 and the high-resolution live view image 480, it is important to accurately correct for any differences between the exposure level and flare for the two images. To create an estimate of relative exposure level and flare, the following relationship is assumed:

$$X(x,y) = \text{ExposureFactor} \cdot Y(x,y) + \text{FlareDelta} \qquad (1)$$

where X(x,y) are the pixel values of the still image 345, Y(x,y) are the pixel values of the high-resolution live view image 480, and (x, y) refers to the pixel coordinates. ExposureFactor and FlareDelta are two unknown constants which must be determined in order to relate the two images. For image data in a linear exposure metric, two images differing only in exposure level can be related by a multiplicative term as represented by ExposureFactor. Remaining differences between the two images that are not modeled by a multiplicative term, such as differences in flare, can be modeled with an additional offset term, as given by FlareDelta.

In general, exposure level differences between two images, and hence the ExposureFactor term, can be determined from the camera capture system, however due to variations in the performance of mechanical shutters, and other camera components, there can be a significant difference between the recorded exposure level and the actual exposure level of an image. In a preferred embodiment, the ExposureFactor and FlareDelta constants are estimated directly from the still image 345 and the high-resolution live view image 480 as follows. First, the reconstructed still and the final live view images are paxelized using a paxelize images step 620. As is known in the art, paxelization of an image involves combining multiple image pixels to form a small image representation (e.g., 12×8 paxels). In one embodiment, the image is divided into rectangular groups of pixels and the average pixel value within each group is calculated. Alternately, the image can be downsized with prefiltering to form small image representation.

In a preferred embodiment, the reconstructed still and the final live view images are CFA data, and the paxelized version of each image is formed using only image data from a single channel. For example, the green pixel data can be used in computing the paxelized images. Alternatively, all three channels of Bayer pattern CFA data can be used to generate luminance values for the paxelized image. In the case that the reconstructed still and the final live view images are full color images having red, green and blue values at every pixel location, the paxelized images can be formed using data from a single channel, or by computing a luminance channel from the full color image and deriving a paxelized image from the luminance image data.

The paxelized representations of the still image 345 and the high-resolution live view image 480 are given as $X^P(i, j)$ and $Y^P(i, j)$, respectively, where (i, j) are paxel coordinates. The paxelized images are vectorized and arranged into a two-column data array, where each row of the data array contains one still image paxel value from $X^P$ and the corresponding high-resolution live view paxel value from $Y^P$.

Next, a remove paxels step 625 is used to remove all rows of data in the data array that contain clipped paxel values, as well as all rows that contain paxel values that are considered to be dominated by noise. The threshold used to determine if a paxel value is dominated by noise can be set based upon noise data for a given population of capture devices.

A regress paxel data step 630 is used to perform a linear regression on the remaining data in the data array to compute slope and offset values 635 relating the data in the first column of the array to the data in the second column of the array. The slope value represents the exposure level scale factor (ExposureFactor); the offset value represents an estimate of global flare difference (FlareDelta).

Next, an adjust live view image step 640 is used to apply the slope and offset values 635 to the high-resolution live view image 480, forming an adjusted live view image 645. This is accomplished by applying the equation given in Eq. (1). In this way, the exposure values in the adjusted live view image 645 will be consistent with those in the still image 345. If an estimate of the overall flare level in the still image 345 is available, this value can be subtracted from both the still image 345 and the adjusted live view image 645 to produce images having reduced flare.

Figure 7:
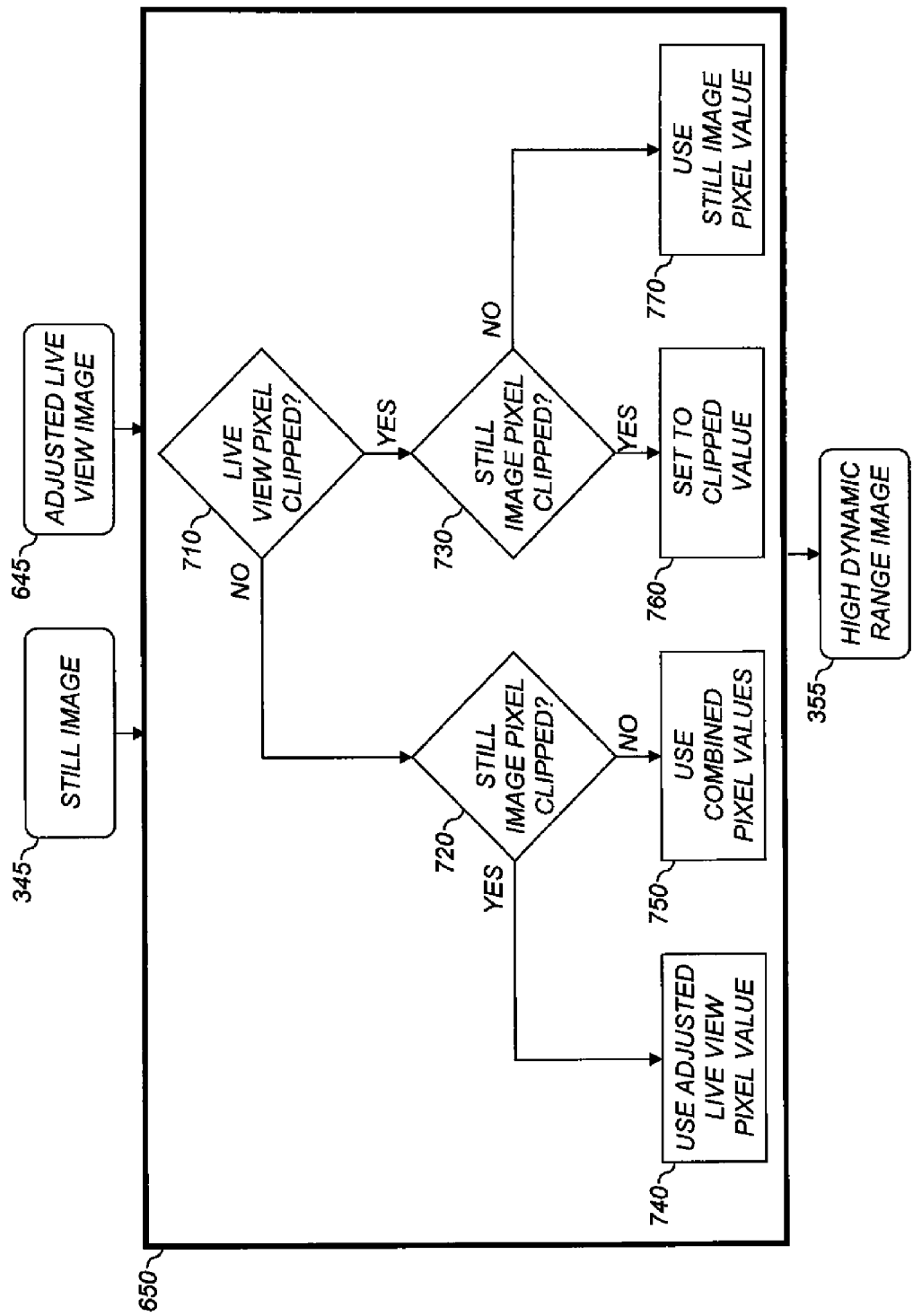
FIG. 7 is a flow chart of a method for combining a still image and an adjusted live view image according to an embodiment of the present invention.

Finally, the still image 345 and the adjusted live view image 645 are combined using a combine images step 650 to form the high-dynamic range image 355. Additional details of the combine images step 650 are described in FIG. 7. The steps shown in this figure are applied to each pixel of the images. First, a live view pixel clipped test 710 is used to test whether a particular pixel in the adjusted live view image 645 is clipped. If it is not clipped, a still image pixel clipped test 720 is used to test whether the corresponding pixel in the still image 345 is clipped. If the still image pixel clipped test 720 indicates that the still image pixel is clipped, then a use adjusted live view pixel value step 740 is used to set the corresponding pixel in the high dynamic range image 355 equal to the pixel value from the adjusted live view image 645.

If the still image pixel clipped test 720 indicates that the still image pixel is non clipped, then a use combined pixel values step 750 is used to set the corresponding pixel in the high dynamic range image 355 equal to a combination of the pixel values from the still image 345 and the adjusted live view image 645. One method for combining the pixel values in the use combined pixel values step 750 is to average the pixel values of the still image 345 and the adjusted live view image 645. Another method can be to average weighted pixel values, where the weights are a function of the pixel values, such as is described by Devebec et al. in the article "Recovering high dynamic range radiance maps from photographs" (SIGGRAPH'97 Conference Proceedings, pp. 369-378, 1997), or as described by Mann in commonly assigned U.S. Pat. No. 5,828,793, or as described by Ikeda in commonly assigned U.S. Pat. No. 6,040,858, which are incorporated herein by reference.

If the live view pixel clipped test 710 indicates that the pixel in the adjusted live view image 645 is clipped, then a still image pixel clipped test 730 is used to test whether the corresponding pixel in the still image 345 is clipped. If the still image pixel value is clipped, then the corresponding pixel in the high dynamic range image 355 equal to a clipped pixel value using a set to clipped value step 760. In one embodiment of the present invention, the clipped pixel value corresponds to the larger of the clipping points in the still image 345 and the adjusted live view image 645.

If the still image pixel clipped test 730 still image pixel value is not clipped, then use still image pixel value step 770 is used to set the corresponding pixel in the high dynamic range image 355 equal to the pixel value from the still image 345.

Returning to a discussion of FIGS. 3A and 3B, as mentioned above, some embodiments of the present invention involve capturing multiple live view images 325. If each of the live view images 325 are captured at the same exposure level, then a single live view image (e.g., the last live view image that was captured) can be selected for using in the method combine images step 350. Alternately, a plurality of the live view images can be combined to reduce noise in the live view images. However, care must be taken to account for any global or local motion of the scene between image captures.

If the live view images 325 have been captured at different exposure levels, then the combine images step 350 can be performed multiple times using each of the live view images. For example, consider the case where a first live view image having a lower exposure level than the still image 345 and a second live view image having a higher exposure level than the still image 345 are captured. First, the combine images step 350 can be executed to combine the still image 345 with the first live view image producing a first high dynamic range image. Then, the combine images step 350 can be executed a second time to combine the first high dynamic range image with the second live view image to produce a final high dynamic range image.

In an alternate embodiment, high-resolution live view images 480 can be determined corresponding to each of the live view images 325 having different exposure levels. The combine images step 485 shown in FIG. 6A can then be modified to determine scale and offset values 635 for each of the high-resolution live view images 480 and use to form a corresponding set of adjusted live view images 645. The set of adjusted live view images 645 can be then combined to form a single aggregate adjusted live view image using a method analogous to that shown in FIG. 7. The aggregate adjusted live view image can then be combined with the still image 345 using the combine images step 650. Alternately, the combine images step 650 can be generalized to combine the still image 345 with the set of adjusted live view images 645. In this case, for each image pixel, the pixel values from the images that are not clipped can be combined to determine the corresponding pixel value of the high dynamic range image 355.

Once the still image 345 and the live view images 325 have been combined to form the high dynamic range image 355, it can be optionally rendered to an output space using the render to output space step 360. For example, it can be rendered to an sRGB image by means of a tone scale processing operation, such as described in U.S. Pat. No. 7,130,485 by Gindele et al., which is incorporated herein by reference. This approach makes use of the high dynamic range information to form an improved image which preserves some of the highlight and shadow detail that would normally be lost when the image is rendered for display on a typical output device. Note that the render to output space step 360 can be skipped if the image is to be displayed on a device inherently capable of handling and displaying a high dynamic range image, or is to be stored in an extended range form for later processing.

Figure 4B:
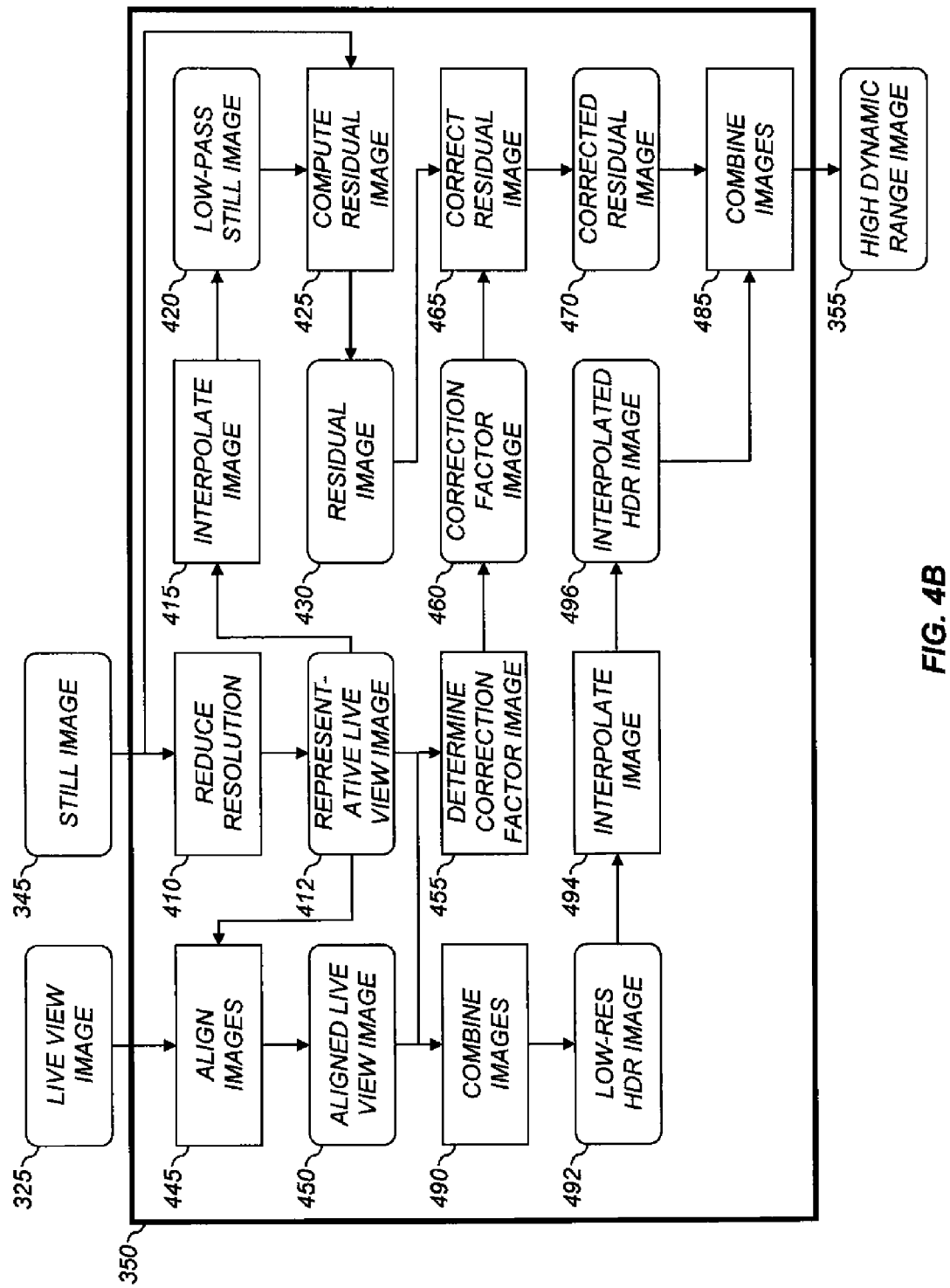
FIG. 4B is a flowchart of a method for combining live view and still images according to an alternate embodiment the present invention.

FIG. 4B illustrates an alternate method for performing the combine images step 350 in FIGS. 3A and 3B according to another embodiment of the present invention. The inputs to this step are a still image 345 and at least one live view image 325. Where the steps in this steps in this method are identical to, or analogous to, corresponding steps in FIG. 4A, the same reference numbers have been used.

In reduce resolution step 410, the resolution of the still image 345 is reduced to be the same as the resolution of the live view image 325, producing a representative live view image 412. In align images step 445, the live view image 325 is aligned with the representative live view image 412 to account for motion that may have occurred between the two exposures, producing aligned live view image 450. The method of alignment may be similar to the alignment method described with respect to FIG. 4A.

The representative live view image 412 is subsequently spatially interpolated back to the resolution of the original still image 345 using the interpolate image step 415 to generate low-pass still image 420.

In compute residual image step 425, the low-pass still image 420 is subtracted from the original still image 345 to generate residual image 430. As discussed earlier, if the original still image 345 and low-pass still image 420 are of different sizes, the residual image 430 can be the same size as the low-pass still image 420, and additional rows/columns from the original still image 345 can be ignored. Alternatively, the residual image 430 can be the same size as the original still image 345, and the residual image 430 can have values equal to the original still image 345 at any locations outside the boundaries of the low-pass still image 420.

In determine correction factor image step 455, correction factor image 460 is determined responsive to the aligned live view image 450 and the representative live view image 412. In this step, the image having the lesser exposure level is used to determine the amounts of clipping present in the image having the greater exposure level to produce the correction factor image 460. The method to produce the final correction factor image may be similar to the method described with respect to FIG. 4A. Any pixels that exist at the still image resolution and that are missing at the live view resolution should be initialized to having a value of one. As in the method of FIG. 4A, a correct residual image step 465 is used to the correction factor image 460 and the residual image 430, producing corrected residual image 470.

Figure 6B:
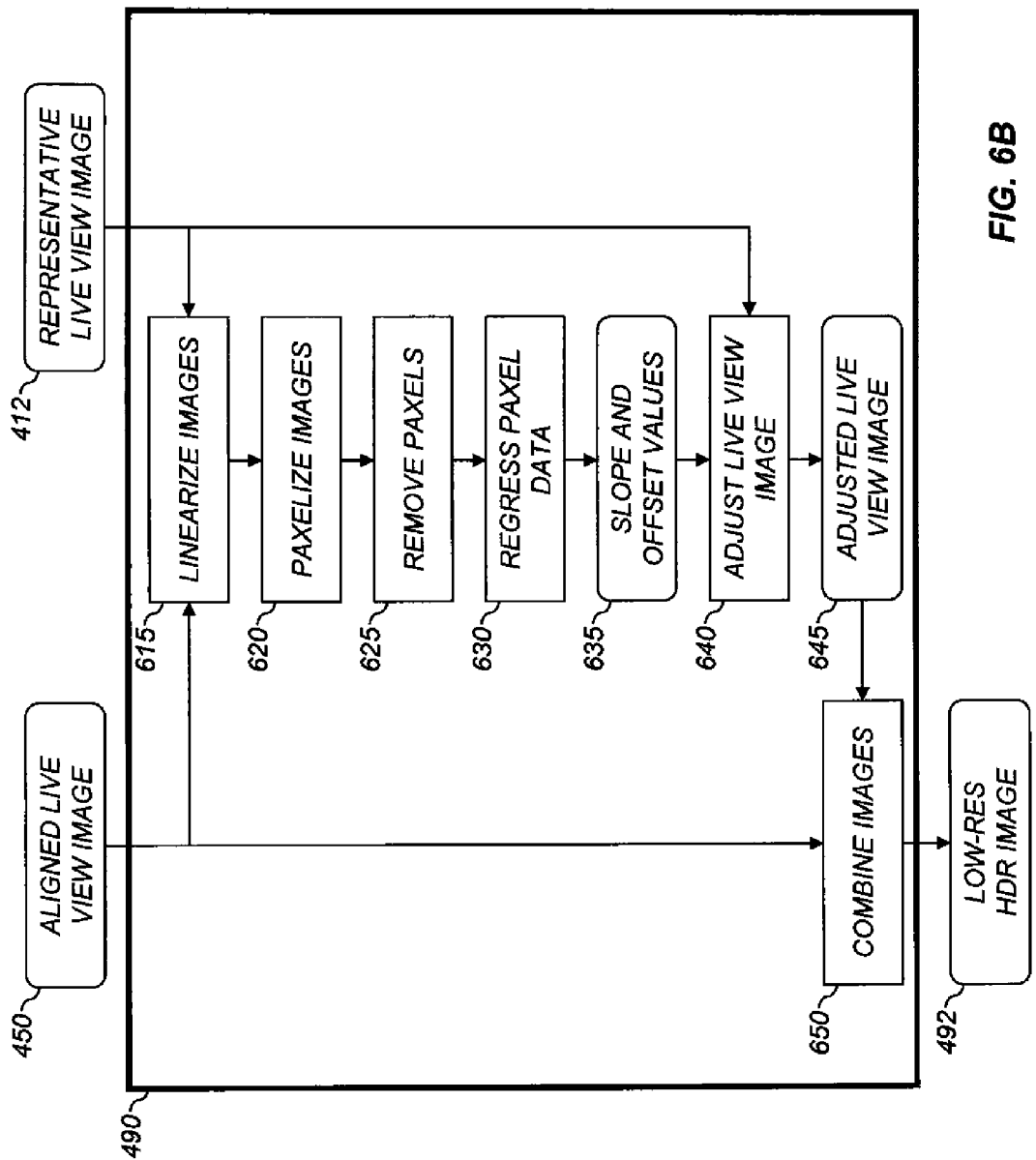
FIG. 6B is a flow chart of a method for combining a live view image and a representative live view image according to an embodiment of the present invention.

A combine images step 490 is used to combined the aligned live view image 450 and the representative live view image 412 to produce a low-resolution high dynamic range image 492. FIG. 6B describes the combine images step 490 in more detail according to a preferred embodiment of the present invention. The steps shown in FIG. 6B are identical to those described relative to the combine image step 485 in FIG. 6A.

Returning to a discussion of FIG. 4B, the low-resolution high dynamic range image 492 is interpolated back to the resolution of the (possibly cropped) still image 345 producing an interpolated high dynamic range image 496 using an interpolate image step 494. In a preferred embodiment, the interpolate image step 494 is identical to the interpolate image step 415.

Finally, the interpolated high dynamic range image 496 and the corrected residual image 470 are combined using combine images step 485 to produce the high dynamic range image 355. The high dynamic range image 355 will have the extended dynamic range associated with the interpolated high dynamic range image 496, but will have a resolution and level of image detail equivalent to the still image 345. One method to combine the interpolated high dynamic range image 496 and the corrected residual image 470 is to add the two images together. In some embodiments, noise-reduction can be applied to the corrected residual image 470 before adding it the interpolated high dynamic range image 496. Those skilled in the art will recognize that there are other methods of combining the interpolated high dynamic range image 496 with a corrected residual image 470 to produce the high dynamic range image 355 including, but not limited to, linearly or non-linearly transforming the corrected residual image before adding the interpolated live view image.

In a preferred embodiment, the live view image 325 and the still image 345 processed according to the methods of FIGS. 4A and 4B are CFA images. Likewise, the resulting high dynamic range image 355 having increased dynamic range is also a CFA image. In this case, the well-known image processing step of CFA interpolation is performed after the high dynamic range image has been produced. Alternatively, CFA interpolation can be applied to the live view image 325 and the still image 345 prior to performing the combine images step 350 according to the present invention. In this case, the steps of the described methods can be performed with full color images.

In some embodiments, a local motion estimation or motion detection method is used to identify regions of object motion within the scene during the sequence of captured images. Pixels corresponding to object motion are identified, and are processed differently in the determine correction factor image step 455 (FIGS. 4A and 4B), in the combine images step 485 (FIG. 4A), and the combine images step 490 (FIG. 4B). In particular, since the scene content does not match among the still image 345 and the one or more live view images 325 in regions identified as having object motion, the live view images 325 are not used to improve the dynamic range of the still image 345 in those regions. Methods of motion detection are well-known to those of skill in the art, and any suitable method can be applied to detect moving regions in the still and live view images.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10 Light
11 Imaging stage
12 Lens
13 Filter block
14 Iris
16 Brightness sensor
18 Shutter
20 Image sensor
22 Analog signal processor
24 A/D converter
26 Timing generator
28 Image sensor stage
30 Bus
32 DSP memory
36 Digital signal processor (DSP)
38 Processing stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display
90 CFA pattern
310 Push capture button to S1 step
320 Capture live view images step
325 Live view image
330 Push capture button to S2 step
335 Capture additional live view images step
340 Capture still image step
345 Still image
350 Combine images step
355 High dynamic range image
360 Render to output space step
365 Rendered high dynamic range image
410 Reduce resolution step
412 Representative live-view image
415 Interpolate image step
420 Low-pass still image
425 Compute residual image step
430 Residual image
435 Interpolate image step
440 Interpolated live view image
445 Align images step
450 Aligned live view images
455 Determine correction factor image step
460 Correction factor image
465 correct residual step
470 corrected residual image
475 Combine images step
480 high-resolution live view image 485 Combine images step
490 Combine images step
492 low-resolution high dynamic range image
494 Interpolate image
496 interpolated high dynamic range image
510 Exposure test
515 Still image clipped test
520 determine mean exposure factor step
525 determine gained live view image step
530 determined clipped gained live view image step
535 determined clipped live view image step
540 determine initial correction factor image step
545 refine correction factor image step
555 live view image clipped test
560 determine mean exposure factor step
565 determine gained still image step
570 determine clipped gained still image step
575 determine clipped still image step 575
580 determine initial correction factor image step
585 Determine mean exposure factor step
615 Linearize images step
620 Paxelize images step
625 Remove paxels step
630 Regress paxel data step
635 Slope and offset values
640 Adjust live view image step
645 Adjusted live view image
650 Combine images step
710 Live view pixel clipped test
720 Still image pixel clipped test
730 Still image pixel clipped test
740 use adjusted live view pixel value step
750 use combined pixel values step 750
760 set to clipped value step
770 use still image pixel value step

The invention claimed is:

1. A method for producing a high-dynamic-range image, comprising:
   a) receiving a low-resolution image of a scene having a first resolution and captured at a first exposure level;
   b) receiving a first high-resolution image of the scene having a second resolution and captured at a second exposure level different from the first exposure level, the second resolution being greater than the first resolution;
   c) using a data processor to form a residual image corresponding to high spatial frequency content in the first high-resolution image;
   d) using a data processor to form a second high-resolution image having the second resolution and the first exposure level by combining the low-resolution image and the residual image;
   e) using a data processor to produce the high-dynamic-range image by combining the first high-resolution image and the second high-resolution image; and
   f) storing the high-dynamic-range image in a processor accessible memory.

2. The method of claim 1 wherein the low-resolution image and the first high-resolution image are captured using a digital camera.

3. The method of claim 2 wherein the digital camera has a preview mode providing a live view image stream, and wherein the low-resolution image is a live view image captured from the live view image stream.

4. The method of claim 1 wherein the first exposure level is less than the second exposure level.

5. The method of claim 1 wherein the first exposure level is greater than the second exposure level.

6. The method of claim 1 wherein step c) includes:
   i) determining a representative low-resolution image from the first high-resolution image, wherein the representative low-resolution image has substantially the same resolution as the low-resolution image;
   ii) resizing the representative low-resolution image to produce a resized representative low-resolution image having the same resolution as the first high-resolution image, and
   iii) determining the residual image responsive to a difference between the first high-resolution image and the resized representative low-resolution image.

7. The method of claim 1 wherein step c) includes:
   i) determining a low-pass image by applying a low-pass convolution filter to the first high-resolution image; and
   ii) determining the residual image responsive to a difference between the first high-resolution image and the low-pass image.

8. The method of claim 1 wherein step c) includes applying a high-pass convolution filter to the first high-resolution image, the high-pass convolution filter being designed to provide an estimate of frequency content from the first high-resolution image that is not included in the low-pass image.

9. The method of claim 1 wherein step d) includes adding the low-resolution image and the residual image.

10. The method of claim 1 wherein step d) includes the step of modifying the residual image in pixel neighborhoods surrounding pixels where either the first high-resolution image or the low-resolution image is clipped.

11. The method of claim 10 wherein the residual image is modified by multiplying the residual image by a correction factor, and wherein the correction factor is a function of the maximum amount of clipping in the pixel neighborhood.

12. The method of claim 1 wherein pixel values for the high-dynamic-range image are determined by forming a weighted combination of corresponding pixel values from the first high-resolution image and the second high-resolution image.

13. The method of claim 12 wherein weights for the weighted combination vary as a function of pixel value in the first high-resolution image or the second high-resolution image.

14. The method of claim 12 wherein any clipped pixels are excluded from the weighted combination.

15. The method of claim 1 further including using an alignment step to correct for alignment differences between the low-resolution image and the first high-resolution image.

16. The method of claim 1 wherein pixel values of the low-resolution image and the first high-resolution image are linear with scene exposure.

17. The method of claim 1 wherein the low-resolution image and the first high-resolution image are color filter array images captured with an image sensor having an array of color filters disposed over photo-sensitive pixels, the array of color filters including at least three different types of color filters corresponding to at least three different color channels, and wherein the steps c)-e) are applied independently to image pixels corresponding to each of the color channels such that the high-dynamic-range image is a color filter array high-dynamic-range image.

18. The method of claim 17 further including applying a color filter array interpolation algorithm to determine a full color high-dynamic-range image responsive to color filter array high-dynamic-range image.

19. The method of claim 1 further including receiving a second low-resolution image of the scene having the first resolution and captured at a third exposure level, the third exposure level being different from the first and second exposure levels, and wherein the high-dynamic-range image is produced responsive to a third high-resolution image having the second resolution and the third exposure level, the third high-resolution image being formed by combining the second low-resolution image and the residual image.

20. The method of claim 19 wherein the first exposure level is less than the second exposure level and the third exposure level is greater than the second exposure level.

21. A digital camera system for producing high-dynamic-range images, comprising:
   an image sensor for capturing digital images;
   an optical system for forming an image of a scene onto the image sensor;
   a data processing system;
   a storage memory for storing captured images; and
   a program memory communicatively connected to the data processing system and storing instructions configured to cause the data processing system to implement a method for producing high-dynamic-range images, wherein the instructions include:

a) capturing a low-resolution image of a scene having a first resolution and a first exposure level;

b) capturing a first high-resolution image of the scene having a second resolution and a second exposure level, the second exposure level being different from the first exposure level and the second resolution being greater than the first resolution;

c) determining a residual image corresponding to high spatial frequency content in the first high-resolution image;

d) determining a second high-resolution image having the second resolution and the first exposure level by combining the low-resolution image and the residual image;

e) producing the high-dynamic-range image by combining the first high-resolution image and the second high-resolution image; and f) storing the high-dynamic-range image in the storage memory.

* * * * *